United States Patent
Hayashi

(10) Patent No.: US 9,488,846 B2
(45) Date of Patent: Nov. 8, 2016

(54) OPTICAL UNIT AND IMAGING APPARATUS

(71) Applicant: Sony Corporation, Tokyo (JP)

(72) Inventor: Tsuneo Hayashi, Chiba (JP)

(73) Assignee: Sony Corporation, Tokyo (JP)

( * ) Notice: Subject to any disclaimer, the term of this patent is extended or adjusted under 35 U.S.C. 154(b) by 114 days.

(21) Appl. No.: 14/457,836

(22) Filed: Aug. 12, 2014

(65) Prior Publication Data

US 2015/0062699 A1   Mar. 5, 2015

(30) Foreign Application Priority Data

Sep. 5, 2013  (JP) .................................. 2013-183851

(51) Int. Cl.
  *G02B 27/26*  (2006.01)
  *H04N 13/04*  (2006.01)
  *G02B 27/28*  (2006.01)

(52) U.S. Cl.
  CPC .............. *G02B 27/26* (2013.01); *G02B 27/286* (2013.01); *H04N 13/0434* (2013.01)

(58) Field of Classification Search
  CPC .... A61B 1/05; H04N 13/0434; G02B 27/22; G02B 27/26
  USPC ......... 359/465; 348/45–50, 57, 58; 396/324; 356/364
  See application file for complete search history.

(56) References Cited

U.S. PATENT DOCUMENTS 5,649,897 A  *  7/1997  Nakamura ............... A61B 1/05
                                                       348/45
2010/0103417 A1*  4/2010  Otani ..................... G01N 21/23
                                                       356/364

FOREIGN PATENT DOCUMENTS

JP    2009-291358 A   12/2009
JP    2011-035853 A    2/2011

* cited by examiner

*Primary Examiner* — Audrey Y Chang
(74) *Attorney, Agent, or Firm* — Wolf, Greenfield & Sacks, P.C.

(57) ABSTRACT

An optical unit includes a condensing lens which condenses light from an object; a pupil splitting polarization separation element which separately outputs two linearly polarized light beams of which polarizing directions are different from the condensed light using a left eye polarization separation region and a right eye polarization separation region which are formed by having a pupil splitting line which is orthogonal to an optical axis as a border; a polarizing direction conversion element which converts polarizing directions of the two linearly polarized light beams which are output from the pupil splitting polarization separation element; and a rotation driving unit which rotates the pupil splitting polarization separation element and the polarizing direction conversion element in an optical axis rotational direction.

7 Claims, 9 Drawing Sheets

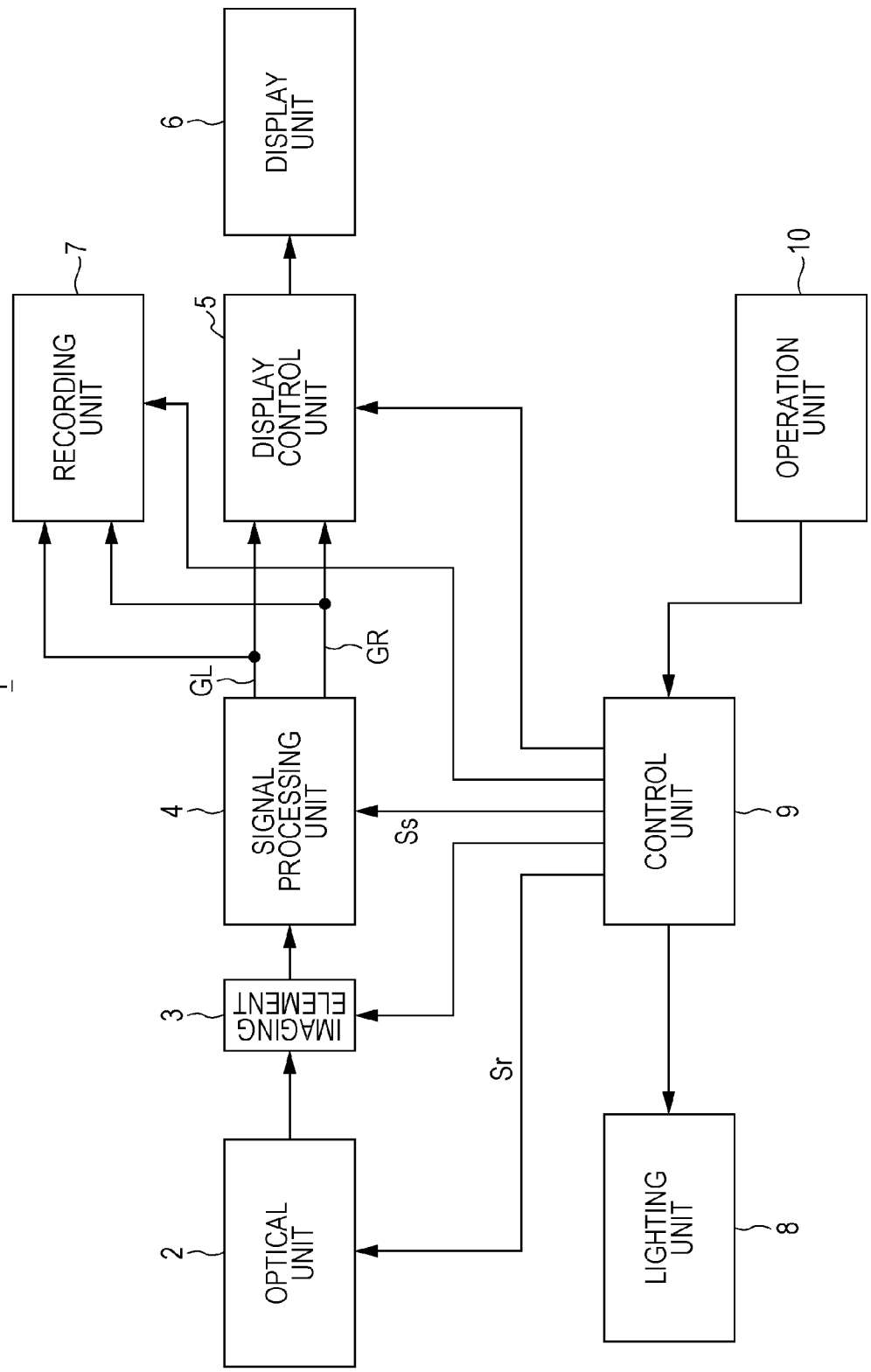

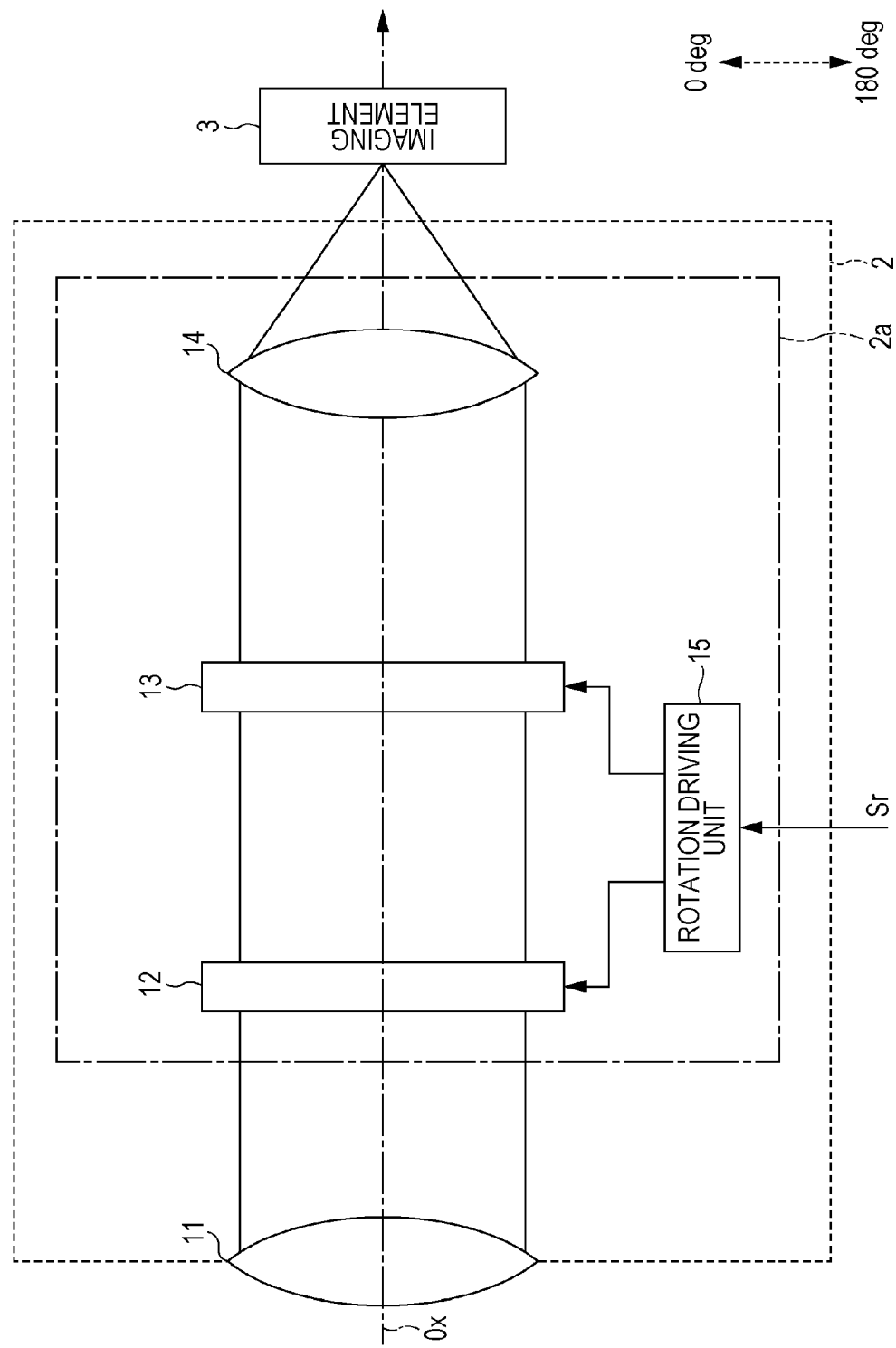

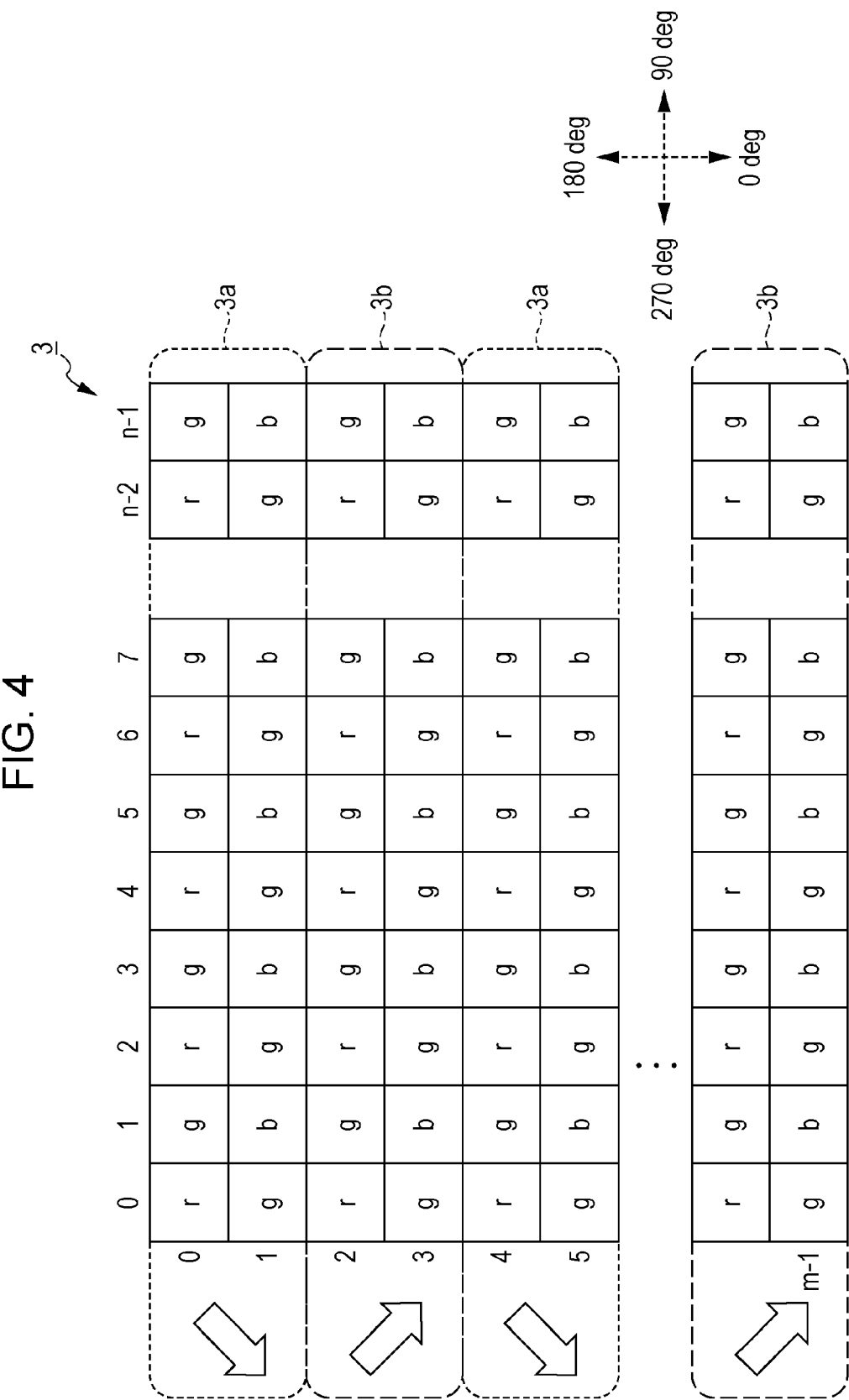

a = 0 deg    a/2 = 0 deg a = 45 deg    a/2 = 22.5 deg a = 90 deg    a/2 = 45 deg a = 135 deg    a/2 = 67.5 deg a = 270 deg    a/2 = 135 deg a = 315 deg    a/2 = 157.5 deg

OPTICAL UNIT AND IMAGING APPARATUS

CROSS REFERENCE TO RELATED APPLICATIONS

This application claims the benefit of Japanese Priority Patent Application JP 2013-183851 filed Sep. 5, 2013, the entire contents of which are incorporated herein by reference.

BACKGROUND

The present technology relates to technical fields related to an optical unit which images a stereoscopic image, and an imaging apparatus which images a stereoscopic image.

An operation microscope which is used in a surgical operation, or the like, for example, has been widely known. As the operation microscope, there is a microscope which also has an imaging function of obtaining a target imaged image, not only an observing function using naked eyes through an eyepiece (for example, refer to Japanese Unexamined Patent Application Publication No. 2009-291358). According to such an operation microscope, it is possible for a practitioner to perform an observation using naked eyes, and for an assistant to perform the observation using an imaged image, respectively, for example, when the practitioner as a surgeon, or the like, and the assistant, or the like, thereof observe a target.

In addition, there is a microscope which is configured so as to present a stereoscopic image of a target in the operation microscope which has the imaging function (for example, refer to Japanese Unexamined Patent Application Publication No. 2011-35853). An imaging apparatus which includes a photographing lens (111) which condenses light from an object, a separation unit (polarizing filter 114) which horizontally separates the condensed light in a region in which light diffused from one point of the object becomes parallel light, and makes the light into different polarized light beams, respectively, an imaging lens (115) on which the different polarized light beams which are separated are formed, respectively, a transmission unit (left polarizing plate 171 and right polarizing plate 172) which receives the formed different polarized light beams on the same plane, and transmits any one of the polarized light beams in each region on the plane, an imaging element (170) which converts the transmitted light on the plane into an image using an electronic signal, and an image generation unit (signal processing units 211 and 212) which generates two different images by extracting the converted image in each the region, and interpolating the image is disclosed in Japanese Unexamined Patent Application Publication No. 2011-35853.

In order to obtain a stereoscopic image, it is necessary to individually obtain a left eye image corresponding to an image obtained by viewing a target with a left eye, and a right eye image corresponding to an image obtained by viewing a target with a right eye. It is possible to execute stereopsis by presenting a left eye image on the left eye, and a right eye image on the right eye of a viewer. In an imaging apparatus which is described in Japanese Unexamined Patent Application Publication No. 2011-35853, a boundary line between a left polarizer 141 and a right polarizer 142 in the polarizing filter 114 functions as a so-called pupil splitting line, and an image corresponding to the left eye image and an image corresponding to the right eye image are separated by having the pupil splitting line as a boundary. In addition, it is set such that the separated images are selectively transmitted using the left polarizing plate 171 and the right polarizing plate 172, and are individually received by the imaging element 170 as the left eye image and the right eye image.

SUMMARY

Here, a case in which one of observers (for example, practitioner) observes a target using naked eyes through an eyepiece, and the other (for example, assistant) observes the target using an imaged image is assumed. When there is a plurality of observers in this manner, it is difficult for the observers to be present in the same place, and usually the observers face each other from different places, respectively, with respect to the target. That is, a bearing in which an observer who uses naked eyes is located with respect to a target is different from a bearing in which an observer who uses a stereoscopic image is located with respect to the target. In addition, here, "bearing" means a bearing which is defined between 0 degrees and 360 degrees radially about the target.

At this time, it is necessary to design an optical system for obtaining a stereoscopic image by taking a bearing in which an observer is located with respect to a target into consideration. In order to execute appropriate stereopsis, it is necessary to appropriately set an angle of the pupil splitting line (angle about optical axis). Specifically, it is necessary to set an orientation of the pupil splitting line so as to match a direction orthogonal to the horizontal direction when practically viewing a target from a bearing in which an observer is located using a stereoscopic image. For this reason, in the optical system for obtaining a stereoscopic image, an installation angle of the polarizing filter 114 is set so that such an orientation of the pupil splitting line is realized.

However, a point to be noted here is that a location of an observer with respect to a target is not limited so as to be fixed.

When the installation angle of the polarizing filter 114 is set as described above, if a bearing in which an observer is located with respect to a target is changed, an orientation of the pupil splitting line is deviated from a direction which is orthogonal to the horizontal direction when a target is practically viewed from a bearing in which the observer is located. For this reason, it is not possible to present a stereoscopic image to an observer with no sense of incompatibility.

In this case, in order to present a stereoscopic image to an observer with no sense of incompatibility, the polarizing filter 114 may be rotated according to a bearing in which an observer is located, however, when the polarizing filter 114 is rotated, polarizing directions of linearly polarized light beams which are input to the left polarizing plate 171 and the right polarizing plate 172 which are provided on the imaging element 170 are also rotated, and it is not possible to individually receive images corresponding to the left eye image and the right eye image. When the imaging element 170 is rotated according to the rotation of the polarizing direction, it is possible to individually receive light, however, it is difficult to rotate the imaging element 170 when considering an increase in the number of components, securing of a space, or the like, and it is not realistic.

It is desirable to provide an optical unit which can present a stereoscopic image with no sense of incompatibility without rotating an imaging element, even when a bearing in which an observer is located with respect to a target is changed.

According to an embodiment of the present technology, there is provided an optical unit which includes a condensing lens which condenses light from an object; a pupil splitting polarization separation element which separately outputs two linearly polarized light beams of which polarizing directions are different from the condensed light using a left eye polarization separation region and a right eye polarization separation region which are formed by having a pupil splitting line which is orthogonal to an optical axis as a border; a polarizing direction conversion element which converts polarizing directions of the two linearly polarized light beams which are output from the pupil splitting polarization separation element; and a rotation driving unit which rotates the pupil splitting polarization separation element and the polarizing direction conversion element according to an instruction.

In this manner, the polarizing directions of the two linearly polarized light beams are adjusted when the polarizing direction conversion element is rotated, even if the polarizing directions of the two linearly polarized light beams which are output from the pupil splitting polarization separation element are changed, when the pupil splitting polarization separation element (pupil splitting line) is rotated according to a bearing in which an observer is located.

In the optical unit, the polarizing direction conversion element may be configured of a half-wave plate; a direction of a crystal axis of the half-wave plate when rotation angles of the pupil splitting polarization separation element and the polarizing direction conversion element are initial angles may match an intermediate direction of the two linearly polarized light beams which are output from the pupil splitting polarization separation element; and the rotation driving unit may rotate the polarizing direction conversion element by a rotation angle of a half of a rotation angle of the pupil splitting polarization separation element.

In this manner, even when the pupil splitting polarization separation element (pupil splitting line) is rotated according to a change in a bearing in which the observer is located with respect to a target, there is no change in polarizing directions of the two linearly polarized light beams which are output from the polarizing direction conversion element.

In the optical unit, the left eye polarization separation region and the right eye polarization separation region in the pupil splitting polarization separation element may be formed using a polarizer, and a transmission axis in the left eye polarization separation region may be orthogonal to a transmission axis in the right eye polarization separation region.

As described above, since the direction of the crystal axis of the half-wave plate when the rotation angles of the pupil splitting polarization separation element and the polarizing direction conversion element are initial angles matches the intermediate direction of the polarizing direction of the two linearly polarized light beams which are output from the pupil splitting polarization separation element, when the transmission axis of the left eye polarization separation region is orthogonal to the transmission axis of the right eye polarization separation region, it means that angle differences between the polarizing directions of the linearly polarized light beams and the crystal axis of the half-wave plate (angle differences when rotation angles of pupil splitting polarization separation element and polarizing direction conversion element are initial angles) are 45° and −45°, respectively. In this manner, the polarizing directions of the linearly polarized light beams which are output from the polarizing direction conversion element are orthogonal to each other without depending on the rotation of the pupil splitting polarization separation element.

According to another embodiment of the present technology, there is provided an imaging apparatus which includes an optical unit including a condensing lens which condenses light from an object, a pupil splitting polarization separation element which separately outputs two linearly polarized light beams of which polarizing directions are different from the condensed light using a left eye polarization separation region and a right eye polarization separation region which are formed by having a pupil splitting line which is orthogonal to an optical axis as a border, a polarizing direction conversion element which converts the polarizing directions of the two linearly polarized light beams which are output from the pupil splitting polarization separation element, and a rotation driving unit which rotates the pupil splitting polarization separation element and the polarizing direction conversion element in an optical axis rotational direction; and an image obtaining unit configured to unit configured to obtain a left eye image and a right eye image by individually receiving the two linearly polarized light beams of which polarizing directions are converted by the polarizing direction conversion element.

Since the imaging apparatus according to an embodiment of the present technology includes the optical unit according to the embodiment of the present technology, it is possible to make the polarizing directions of the two linearly polarized light beams which are output from the polarizing direction conversion element unchangeable, even when the pupil splitting polarization separation element (pupil splitting line) is rotated according to the change in bearing in which the observer is located.

In the imaging apparatus, an image rotation processing unit which rotates the left eye image and the right eye image may be further included.

In this manner, it is possible to cause an orientation of a target which is projected on a stereoscopic image realized using a left eye image GL and a right eye image GR to match an orientation of a target when an observer practically observes the target from a bearing in which the observer is located with respect to the target.

In the imaging apparatus, the image obtaining unit may obtain the left eye image and the right eye image by individually receiving the two linearly polarized light beams using an imaging element in which two polarizing plates of which directions of transmission axes are different from each other are formed on a light receiving face.

In this manner, it is possible to individually receive two linearly polarized light beams using one imaging element.

In the imaging apparatus, the image obtaining unit may include a polarization beam splitter which spectrally disperses the two linearly polarized light beams, and two imaging elements which receive each of the two linearly polarized light beams which are spectrally dispersed by the polarization beam splitter, respectively.

In this manner, in each of the imaging elements, only one of corresponding linearly polarized light beam of the two linearly polarized light beams is received.

According to the embodiments of the present technology, it is possible to present a stereoscopic image with no sense of incompatibility without rotating an imaging element even when a bearing in which an observer is located with respect to a target is changed.

In addition, the effect described herein is not necessarily limited, and may be any one of effects which are described in the disclosure.

BRIEF DESCRIPTION OF THE DRAWINGS

FIG. 1 is a block diagram which illustrates an internal configuration of an imaging apparatus as one embodiment of the present technology;

FIG. 2 is a diagram which describes an internal configuration of an optical unit which is included in the imaging apparatus;

FIG. 4 is an explanatory diagram of a configuration of an imaging element;

DETAILED DESCRIPTION OF EMBODIMENTS

Figure 3A:
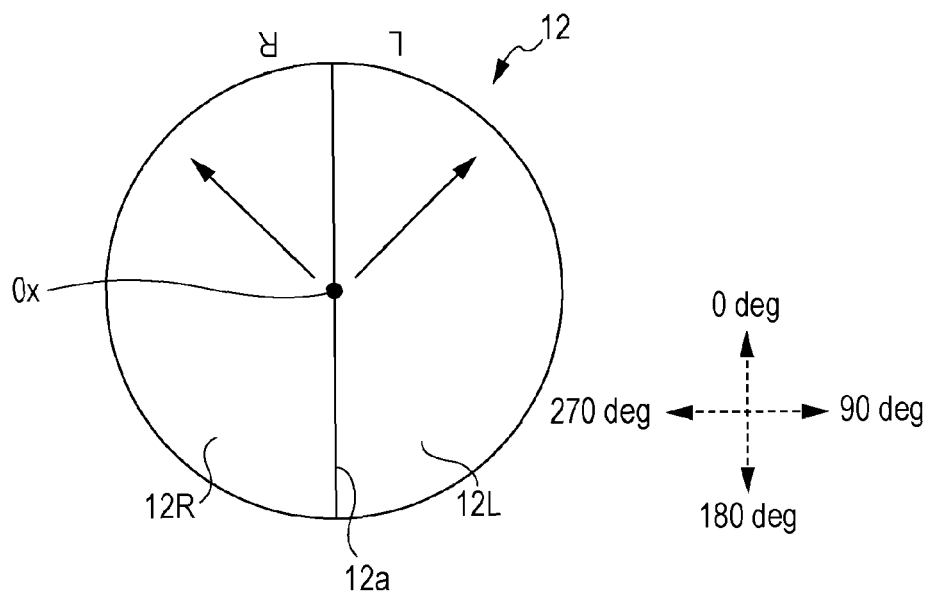
FIGS. 3A and 3B are explanatory diagrams of a pupil splitting polarization separation element and a polarizing direction conversion element.

Hereinafter, embodiments will be described in the following order.

1. Imaging apparatus in embodiment
1-1. Entire configuration of imaging apparatus
1-2. Regarding optical unit and imaging element
1-3. Regarding signal processing unit
1-4. Conclusion and effect
2. Another configuration example of optical unit
2-1. Configuration Example 1
2-2. Configuration Example 2
3. Modification Example
4. Present Technology 1. Imaging Apparatus in Embodiment
1-1. Entire Configuration of Imaging Apparatus FIG. 1 is a block diagram which illustrates an internal configuration of an imaging apparatus 1 as one embodiment of an imaging apparatus according to an embodiment of the present technology.

The imaging apparatus 1 according to the embodiment is set to an operation microscope, for example, and is configured so as to generate a left eye image CL and a right eye image GR for presenting a stereoscopic image to an observer.

The imaging apparatus 1 includes an optical unit 2, an imaging element 3, a signal processing unit 4, a display control unit 5, a display unit 6, a recording unit 7, a lighting unit 8, a control unit 9, and an operation unit 10.

The optical unit 2 condenses light from an object as an observation target, and forms an object image on a light receiving face of the imaging element 3. According to the optical unit 2 in the embodiment, an image corresponding to the left eye image GL and an image corresponding to the right eye image GR are formed on the light receiving face of the imaging element 3 as an object image. In addition, an internal configuration of the optical unit 2 will be described later.

The imaging element 3 is configured of, for example, a Charge Coupled Device (CCD), a Complementary Metal Oxide Semiconductor (CMOS), an image sensor, or the like, receives light corresponding to the object image which is formed on the light receiving face in a pixel unit, and converts the light into an electric signal (photoelectric conversion).

The imaging element 3 is configured so as to individually receive an image corresponding to the left eye image GL, and an image corresponding to the right eye image GR, however, this point will be described later.

The signal processing unit 4 generates the left eye image GL and the right eye image GR based on the electric signal which is obtained in the pixel unit using the imaging element 3, that is, an imaged image signal. In addition, an internal configuration of the signal processing unit 4 will be described later, as well.

The display control unit 5 performs a control of displaying the left eye image GL and the right eye image GR which are generated by the signal processing unit 4 on the display unit 6 as if stereopsis is realized. In the example, the display unit 6 is attached so as to rotate about a mirror body in which the optical unit 2 is embedded, and is set to a display which presents a stereoscopic image using a lenticular system, for example (refer to Japanese Unexamined Patent Application Publication No. 2006-50320).

Alternatively, the display unit 6 may be a glasses-type display. In this case, the display unit 6 is connected to a main body unit of the imaging apparatus 1 through a cable, or is subjected to a display control using the display control unit 5 through wireless communication.

The recording unit 7 is configured so as to perform recording with respect to a removable recording medium such as an optical disk recording medium, a Universal Serial Bus (USB) memory, and a memory card, and records the left eye image GL and the right eye image GR which are generated by the signal processing unit 4 with respect to the removable recording medium which is loaded or inserted in a predetermined data format according to an instruction of the control unit 9.

In addition, it is also possible to configure the recording unit 7 so as to perform recording with respect to a non-removable recording medium such as a Hard Disk Drive (HDD), or a Solid State Drive (SSD), for example.

The lighting unit 8 includes a light source which emits visible light and illuminates an object as an observation target by turning on the light source according to an instruction from the control unit 9.

The control unit 9 is configured of a microcomputer which includes a memory such as a Central Processing Unit (CPU), a Read Only Memory (ROM), and a Random Access Memory (RAM), for example, and the entire control of the imaging apparatus 1 is performed when the CPU executes processes according to a program which is recorded in the ROM, for example.

The operation unit 10 is connected to the control unit 9. An operator for giving various instructions by an observer, or the like, to the imaging apparatus 1 is formed in the operation unit 10. In particular, an operator for instructing a bearing in which an observer is located with respect to a target is formed in the operation unit 10 in the embodiment.

The control unit 9 gives an instruction of input bearing information to the optical unit 2, and the signal processing unit 4, respectively, using instruction signals Sr, and Ss, according to an input of information which denotes a bearing in which the observer is located with respect to a target through the operation unit 10. Operations which are obtained when bearing information is instructed using these instruction signals Sr and Ss will be described later.

In addition, when a configuration in which the display unit 6 rotates about the mirror body is adopted as in the embodiment, it is possible to detect a rotation position (angle) of the display unit 6 as information of a bearing in which the observer is located.

In addition, for confirmation, the "bearing" means a bearing which is defined between 0 degree and 360 degrees radially about the target (observation target) as described above. Here, it is assumed that a direction in which a value of an angle (degree) denoting the bearing increases matches a clockwise direction when the target is viewed from right above.

1-2. Regarding Optical Unit and Imaging Element

FIG. 2 is a diagram which describes an internal configuration of the optical unit 2. In addition, the diagram also illustrates the imaging element 3 along with the internal configuration of the optical unit 2.

Here, in a case of an operation microscope, observation of a target is usually performed by positioning a condensing lens 11 right above the target. In FIGS. 3A to 5G, and FIG. 7, bearings are illustrated under this premise.

As illustrated in FIG. 2, in the optical unit 2, the condensing lens 11, pupil splitting polarizing separation element 12, a polarizing direction conversion element 13, and an image forming lens 14 are arranged in order from a material body side (object side), and a rotation driving unit 15 which rotates the pupil splitting polarizing separation element 12 and the polarizing direction conversion element 13 about an optical axis Ox is formed.

The condensing lens 11 condenses light from an object.

The light which is condensed using the condensing lens 11 is separated into two linearly polarized light beams of which polarizing directions are different using the pupil splitting polarizing separation element 12 at a position in which the light becomes approximately parallel light.

FIG. 3A is a diagram which describes a configuration of the pupil splitting polarizing separation element 12.

The pupil splitting polarizing separation element 12 includes a pupil splitting line 12a which is orthogonal to the optical axis Ox, and a left eye side polarizing separation region 12L and a right eye side polarizing separation region 12R are formed by having the pupil splitting line 12a as a border.

According to the embodiment, both the left eye side polarizing separation region 12L and the right eye side polarizing separation region 12R are formed using a polarizer. As illustrated by a solid arrow in FIG. 3A, directions of the transmission axes (polarizing axes) of the left eye side polarizing separation region 12L and the right eye side polarizing separation region 12R are different from each other, and due to this, two linearly polarized light beams of which polarizing directions are different are separately output due to the left eye side polarizing separation region 12L and the right eye side polarizing separation region 12R. Specifically, according to the embodiment, the transmission axis of the left eye side polarizing separation region 12L is inclined to the pupil splitting line 12a by 45°, and the transmission axis of the right eye side polarizing separation region 12R is inclined to the pupil splitting line 12a by −45°. That is, the transmission axis of the left eye side polarizing separation region 12L is orthogonal to the transmission axis of the right eye side polarizing separation region 12R, and due to this, two linearly polarized light beams of which polarizing directions are orthogonal to each other are separately output due to the left eye side polarizing separation region 12L, and the right eye side polarizing separation region 12R.

Though descriptions using an illustration are omitted, the pupil splitting polarizing separation element 12 is rotatably maintained in a direction about the optical axis Ox using a predetermined mechanism. Hereinafter, a rotation angle in the direction about the optical axis Ox of the pupil splitting polarizing separation element 12 is denoted by "a" degree.

In FIG. 3A, a state in which a rotation angle "a" of the pupil splitting polarizing separation element 12 is an initial angle is illustrated, however, the initial angle of the pupil splitting polarizing separation element 12 is 0 degree. In the state of the initial degree, the pupil splitting line 12a matches an axis of 0 degree to 180 degree, and the left eye side polarizing separation region 12L, is located at a bearing side of 90 degrees with respect to the pupil splitting line 12a, and the right eye side polarizing separation region 12R is located at a bearing side of 270 degrees with respect to the pupil splitting line 12a when being viewed from the image surface side. It means that the state in which the observer is located in a bearing of 0 degree with respect to an object (state in which observer faces object from bearing of 0 degree) is set to the initial state.

In FIG. 2, the polarizing direction conversion element 13 converts the polarizing directions of the two linearly polarized light beams which are output from the pupil splitting polarizing separation element 12. The polarizing direction conversion element 13 in the embodiment is configured of a half-wave plate. In this manner, the polarizing directions of the linearly polarized light which is output from the left eye side polarizing separation region 12L, and the linearly polarized light which is output from the right eye side polarizing separation region 12R are converted by an amount corresponding to an angle difference between the polarizing directions of the linearly polarized light beams and a direction of the crystal axis of the polarizing direction conversion element 13 as the half-wave plate. Specifically, the polarizing direction conversion element 13 as the half-wave plate converts a polarizing direction of an input linearly polarized light by "2D" degrees when an angle difference between the polarizing direction of the input linearly polarized light and the crystal axis is set to a "D" degree. At this time, when performing a conversion of the polarizing direction using the half-wave plate, there is a polarity based on the crystal axis, and specifically, when an angle difference between the polarizing direction of the input linearly polarized light and the crystal axis is +D degree, the polarizing direction of the input linearly polarized light is converted by "−2D" degrees, and when the angle difference is −D degree, the polarizing direction of the input linearly polarized light is converted by "+2D" degrees.

Here, the polarizing direction conversion element 13 is also rotatably maintained in a direction about the optical axis Ox using a predetermined mechanism.

Figure 3B:
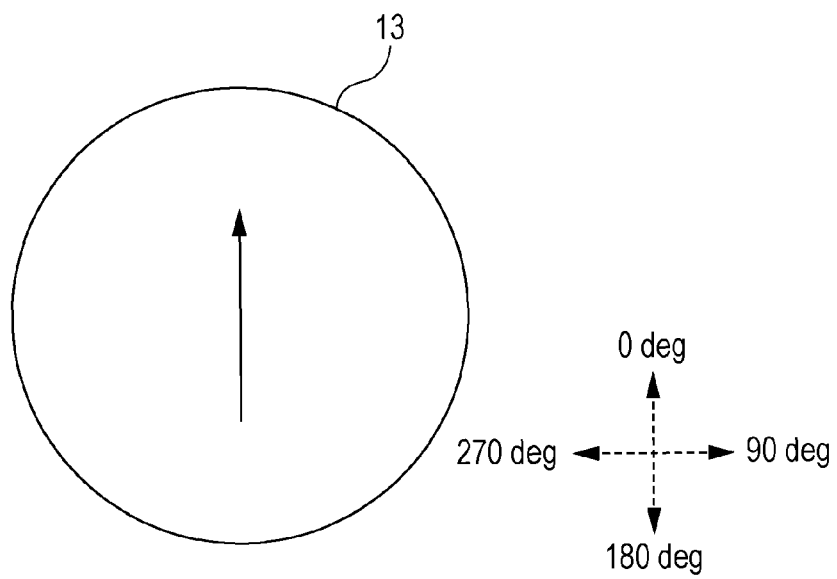

In FIG. 3B, a direction of the crystal axis in a state in which the rotation angle of the polarizing direction conversion element 13 is the initial angle is denoted by a solid arrow. The crystal axis of the polarizing direction conversion element 13 faces a direction of 0 degree in a state in which the rotation angle of the polarizing direction conversion element 13 is the initial angle. It is understood that a direction of the crystal axis of the polarizing direction conversion element 13 (half-wave plate) in this case matches a middle direction of the transmission axis of the left eye side polarizing separation region 12L, and the transmission axis of the right eye side polarizing separation region 12R of the pupil splitting polarizing separation element 12, in contrast to FIG. 3A. That is, a direction of the crystal axis of the half-wave plate when the rotation angles of the pupil splitting polarizing separation element 12 and the polarizing direction conversion element 13 are initial angles matches the middle direction of the polarizing directions of the two linearly polarized light beams which are output from the pupil splitting polarizing separation element 12.

The two linearly polarized light beams of which polarizing directions are converted using the polarizing direction conversion element 13 are formed on the light receiving face of the imaging element 3 by passing through the image forming lens 14 illustrated in FIG. 2.

FIG. 4 is an explanatory diagram related to a configuration of the imaging element 3.

The imaging element 3 according to the embodiment is set to a so-called imaging element of an rggb type, and can perform imaging of a color image. N pixels in total of 0th pixel to n−1th pixel are formed in the horizontal direction, and m pixels in total of 0th pixel to m−1th pixel are formed in the vertical direction in the imaging element 3. In the rggb-type imaging element, 4 pixels in total of 2 pixels in horizontal direction×2 pixels in vertical direction forms one unit, and with respect to the pixels configuring the unit, a color filter of r (red) is formed in a pixel on the upper left, color filters of g (green) are formed in pixels on the upper right and the lower left, respectively, and a color filter of b (blue) is formed in a pixel on the lower right, respectively.

In the imaging element 3, the 0th horizontal line corresponds to a horizontal line on the uppermost side in an imaged image, and the m−1th horizontal line corresponds to a line on the lowermost side in the imaged image. As described above, according to the embodiment, since a state in which an observer is located in a bearing of 0 degree with respect to an object is set to an initial state, in the imaging element 3, an installation angle of the optical axis Ox is set so that the m−1th horizontal line side matches the direction of 0 degree.

Two polarizing plates of 3a and 3b of which directions of transmission axes are different from each other are formed on the light receiving face of the imaging element 3. As illustrated in FIG. 4, the polarizing plates of 3a and 3b are alternately formed in every two horizontal lines. In FIG. 4, directions of transmission axes of the polarizing plates of 3a and 3b are denoted using outlined arrows, however, the transmission axis of each polarizing plate 3a faces a direction of −45 degrees (315 degrees), and the transmission axis of each polarizing plate 3b faces a direction of 45 degrees. Accordingly, each polarizing plate 3a transmits a linearly polarized light of −45 degrees, and each polarizing plate 3b transmits a linearly polarized light of 45 degrees.

Returning to FIG. 2, the rotation driving unit 15 rotates the pupil splitting polarizing separation element 12 and the polarizing direction conversion element 13 based on an instruction signal Sr from the control unit 9 illustrated in FIG. 1. Specifically, the rotation driving unit 15 rotates the pupil splitting polarizing separation element 12 by "a" degree corresponding to the instruction signal Sr, and rotates the polarizing direction conversion element 13 by "(½)a" degrees.

For example, the rotation driving unit 15 in the embodiment is configured so as to include at least a motor which rotates by a rotation amount corresponding to the instruction signal Sr, and a gear for transmitting a rotary power of the motor to a mechanism unit for rotating the pupil splitting polarizing separation element 12 and the polarizing direction conversion element 13, respectively, and provide a difference in rotation angles between the pupil splitting polarizing separation element 12 and the polarizing direction conversion element 13 by ½ according to a gear ratio of the gears.

Figure 5A:
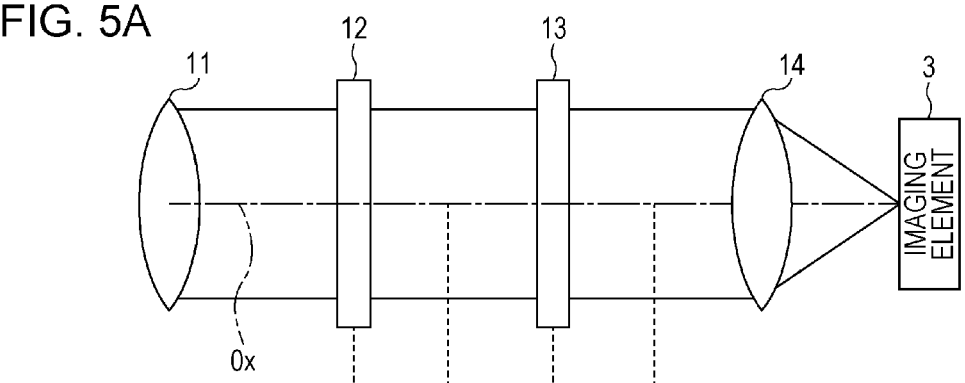
FIGS. 5A to 5G are explanatory diagrams related to operations which are obtained according to rotations of the pupil splitting polarization separation element and the polarizing direction conversion element.
Figure 5B:
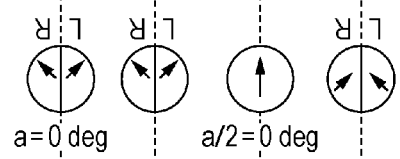
Figure 5C:
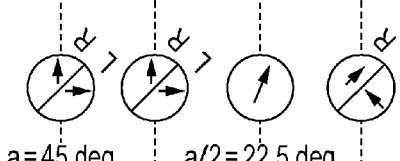
Figure 5D:
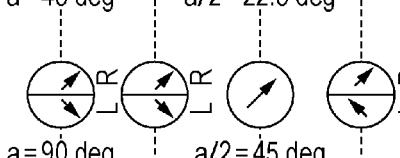
Figure 5E:
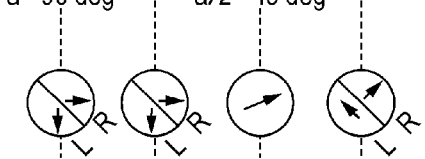
Figure 5F:
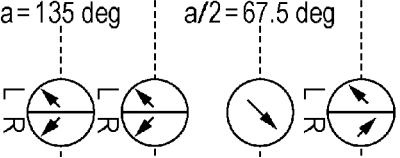
Figure 5G:
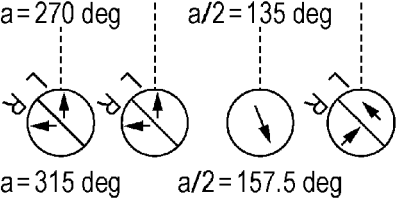

FIGS. 5A to 5G are explanatory diagrams related to operations which are obtained according to rotations of the pupil splitting polarizing separation element 12 and the polarizing direction conversion element 13. FIG. 5A illustrates the condensing lens 11, the pupil splitting polarizing separation element 12, the polarizing direction conversion element 13, the image forming lens 14, and the imaging element 3 in the optical unit 2, and FIGS. 5B to 5G illustrate directions of the transmission axes of the left eye side polarizing separation region 12L and the right eye side polarizing separation region 12R when 0 degrees, 45 degrees, 90 degrees, 135 degrees, 270 degrees, and 315 degrees are respectively instructed as a bearing in which an observer is located with respect to a target, polarizing directions of the two linearly polarized light beams which are separated (transmitted) in the left eye side polarizing separation region 12L and the right eye side polarizing separation region 12R, a direction of the crystal axis of the polarizing direction conversion element 13, and polarizing directions of the two linearly polarized light beams after passing through the polarizing direction conversion element 13.

When a bearing is instructed by an observer, the pupil splitting polarizing separation element 12 is rotated by the rotation angle of "a" degree corresponding to the instruction signal Sr, and the polarizing direction conversion element 13 is rotated by "½a" degrees.

Here, when the rotation angle "a" of the pupil splitting polarizing separation element 12 is set to the initial angle (0 degrees) according to a bearing of 0 degrees which is instructed by the observer, a direction of the transmission axis of the left eye side polarizing separation region 12L is 45 degrees, and a direction of the transmission axis of the right eye side polarizing separation region 12R is −45 degrees. For this reason, also the polarizing directions of the two linearly polarized light beams which are separately output from the pupil splitting polarizing separation element 12 are 45 degrees and −45 degrees, respectively (refer to FIG. 5B).

Hereinafter, the linearly polarized light which passes through the left eye side polarizing separation region 12L is denoted by "linearly polarized light PL", and the linearly polarized light which passes through the right eye side polarizing separation region 12R is denoted by "linearly polarized light PR". In a stage of being separately output from the pupil splitting polarizing separation element 12, a polarizing direction of the linearly polarized light PL is 45 degrees, and a polarizing direction of the linearly polarized light PR is −45 degrees.

In addition, when the rotation angle "a" of the pupil splitting polarizing separation element 12 is the initial angle according to a bearing of 0 degrees which is instructed by an observer, a rotation angle of the polarizing direction conversion element 13 (=a/2) is also 0 degrees, that is, the initial angle due to a=0 degrees. At this time, a direction of the crystal axis of the polarizing direction conversion element 13 is 0 degrees (refer to FIGS. 3B and 5B). For this reason, an angle difference D between the polarizing direction of the linearly polarized light PL which is output from the pupil splitting polarizing separation element 12 and the crystal axis of the polarizing direction conversion element 13 is 45 degrees, and an angle difference D between the polarizing direction of the linearly polarized light PR which is output from the pupil splitting polarizing separation element 12 and the crystal axis of the polarizing direction conversion element 13 is −45 degrees.

Accordingly, when the instructed bearing is 0 degrees, since the polarizing direction of the linearly polarized light PL after passing through the polarizing direction conversion element 13 is converted into "−2D" degrees from the original polarizing direction of 45 degrees, that is, into −2×45 degrees=−90 degrees, it becomes 45 degrees−90 degrees=−45 degrees. On the other hand, when the instructed bearing is 0 degree, since the polarizing direction of the linearly polarized light PR after passing through the polarizing direction conversion element 13 is converted into "+2D" degrees from the original polarizing direction of −45 degrees, that is, into +2×45 degrees=+90 degrees, it becomes −45 degrees+90 degrees=45 degrees.

When calculating polarizing directions of the linearly polarized light PL and PR after passing through the polarizing direction conversion element 13, when the instructed bearing is 45 degrees, 90 degrees, 135 degrees, 270 degrees, and 315 degrees, respectively, using the above described point, the following are obtained.
when 45 degrees: a=45 degrees, a/2=22.5 degrees
PL: 90 degrees−67.5 degrees×2=−45 degrees
PR: 0 degrees+22.5 degrees×2=45 degrees
when 90 degrees: a=90 degrees, a/2=45 degrees
PL: 135 degrees−90 degrees×2=−45 degrees
PR: 45 degrees+0 degree×2=45 degrees
when 135 degrees: a=135 degrees, a/2=67.5 degrees
PL: 180 degrees−112.5 degrees×2=−45 degrees
PR: 90 degrees−22.5 degrees×2=45 degrees
when 270 degrees (−90 degrees): a=270 degrees, a/2=135 degrees
PL: 315 degrees−180 degrees×2=−45 degrees (315 degrees)
PR: 225 degrees−90 degrees×2=45 degrees
when 315 degrees (−45 degrees): a=315 degrees, a/2=157.5 degrees
PL: 0 degrees+157.5 degrees×2=−45 degrees (315 degrees)
PR: 270 degrees−112.5 degrees×2=45 degrees In this manner, in the optical unit 2 according to the embodiment, even when an angle of the pupil splitting line 12a is changed by rotating the pupil splitting polarizing separation element 12 according to the change in bearing in which an observer is located with respect to a target, the polarizing directions of the two linearly polarized light beams PL and PR which are input to the imaging element 3 are unchangeable as −45 degrees and 45 degrees, respectively.

As illustrated in FIG. 4, directions of the polarizing plates 3a and 3b which are formed in the imaging element 3 are −45 degrees and 45 degrees, respectively. Accordingly, in the imaging element 3, only the polarizing plate 3a transmits the linearly polarized light PL, and only the polarizing plate 3b transmits the linearly polarized light PR regardless of the rotation angle of the pupil splitting polarizing separation element 12. That is, even when the pupil splitting polarizing separation element 12 is rotated, a state in which the imaging element 3 individually receives the linearly polarized light PL corresponding to the left eye image GL, and the linearly polarized light PR corresponding to the right eye image GR is maintained.

In this manner, it is not necessary to rotate the imaging element 3 when presenting a stereoscopic image with no sense of incompatibility by rotating the pupil splitting line 12a according to the change in bearing in which an observer is located with respect to a target.

1-3. Regarding Signal Processing Unit

Subsequently, an internal configuration of the signal processing unit 4 will be described with reference to FIG. 6.

Figure 6:
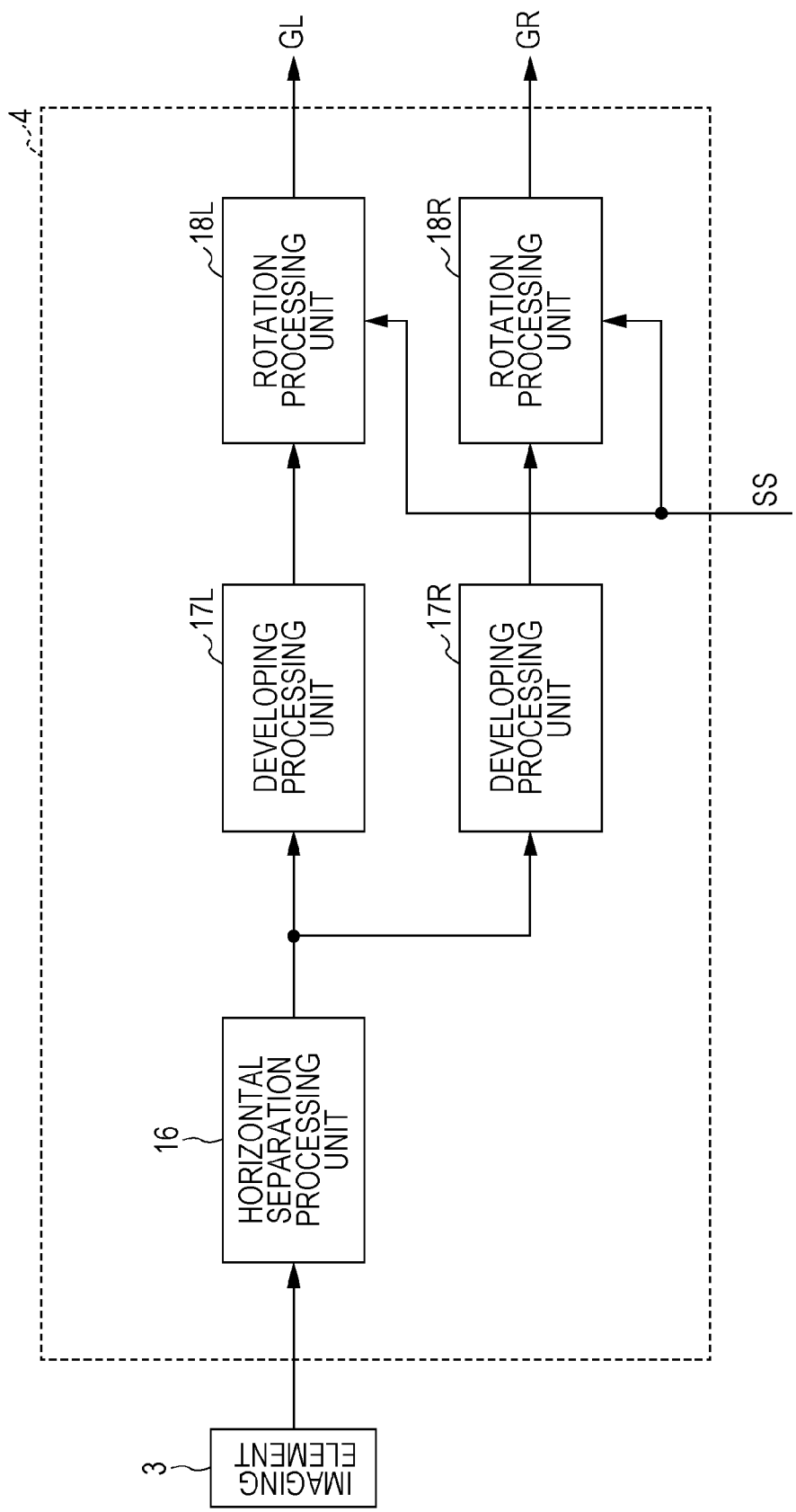
FIG. 6 is a diagram which describes an internal configuration of a signal processing unit.

As illustrated in FIG. 6, the signal processing unit 4 includes a horizontal separation processing unit 16, developing processing units 17L and 17R, rotation processing units 18L and 18R.

The horizontal separation processing unit 16 performs a process of separating an imaged image signal which is obtained in the imaging element 3 into an imaged image signal corresponding to the left eye image GL and an imaged image signal corresponding to the right eye image GR. Specifically, the horizontal separation processing unit 16 in the embodiment reads a light receiving signal of a pixel at a position corresponding to a formation portion of the polarizing plate 3a in the imaging element 3 as the imaged image signal corresponding to the left eye image GL (hereinafter, denoted by "left eye side imaged image signal"), and reads a light receiving signal of a pixel at a position corresponding to a formation portion of the polarizing plate 3b as the imaged image signal corresponding to the right eye image GR (hereinafter, denoted by "right eye side imaged image signal").

The developing processing units 17L and 17R performs developing processing with respect to the left eye side imaged image signal, and the right eye side imaged image signal which are obtained in the horizontal separation processing unit 16.

Here, as the developing processing in the embodiment, at least demosaic processing for obtaining each value of r, g, and b in each pixel of the imaging element 3, and interpolation processing for interpolating omitted portions of the left eye side imaged image signal, and the right eye side imaged image signal are performed. In addition, the omitted portion in the left eye side imaged image signal is a pixel portion in which each polarizing plate 3a is formed, and the omitted portion in the right eye side imaged image signal is a pixel portion in which each polarizing plate 3b is formed.

The demosaic processing is processing in which, regarding a pixel in a location of ith in the horizontal direction, and jth in the vertical direction on the imaging element 3, each value of a color except for a color which is received by a color filter of the pixel is calculated using a value of a pixel with the same color, and which is in the vicinity thereof, respectively. For example, regarding a pixel in a location of (4, 2) for example, values of g and b except for an r value are calculated using a g value and a b value which are obtained in a pixel formed using a g color filter, and a pixel formed using a b color filter which are located in the vicinity of the pixel in the location of (4, 2).

As a specific method of the demosaic processing, it is effective to adopt a method in which weighting coefficient (W) described in Japanese Unexamined Patent Application Publication No. 2011-35853 which is described above is used, when considering a point that the left eye image GL and the right eye image GR correspond to an image in which an object is captured using different viewpoints of left and right.

In addition, the method of demosaic processing is not limited to the method described in Japanese Unexamined Patent Application Publication No. 2011-35853. For example, in the method described in Japanese Unexamined Patent Application Publication No. 2011-35853, demosaic processing with respect to the left eye side imaged image signal is performed also using the right eye side imaged image signal, not only the left eye side imaged image signal, and demosaic processing with respect to the right eye side imaged image signal is performed also using the left eye side imaged image signal, not only the right eye side imaged image signal, however, insisted of this, it is also possible to adopt another method, for example, a method in which demosaic processing of the left eye side imaged image signal and the right eye side imaged image signal are performed using only the left eye side imaged image signal, and the right eye side imaged image signal, respectively.

In addition, for the interpolation processing which is performed by the developing processing units 17L and 17R, it is possible to adopt a method of using an addition average value of pixel values which are located in the vicinity of the pixel in a location of (i, j) which is the interpolation target. In addition, the interpolation processing is performed with respect to the imaged image signal after the demosaic processing, and it is possible to perform the interpolation processing in parallel to the demosaic processing.

The left eye image GL is obtained through the developing processing of the developing processing unit 17L, and the right eye image GR is obtained through the developing processing of the developing processing unit 17R.

The left eye image GL obtained in the developing processing unit 17L is input to the rotation processing unit 18L, and the right eye image GR obtained in the developing processing unit 17R is input to the rotation processing unit 18R.

The rotation processing units 18L and 18R rotate the left eye image GL and the right eye image GR, respectively, by an angle corresponding to the instruction signal Ss from the control unit 9. That is, the rotation processing units rotate the left eye image GL and the right eye image GR by "a" degree which is the same angle as the rotation angle of the pupil splitting polarizing separation element 12.

Here, for an observer of the stereoscopic image, it is preferable that an orientation of a target which is projected on the stereoscopic image match an orientation of the target when the observer actually views the target from a bearing in which the observer is located.

As described with reference to FIG. 4 in advance, since the installation angle of the imaging element 3 in the embodiment is set based on 0 degree, originally an orientation of a target projected on an image matches an orientation of the target when an observer actually observes the target in a bearing of 0 degree. However, in this case, there is a concern that, when an observer is located in another bearing other than 0 degrees, an orientation of a target on an image may not match an orientation of the target when the observer actually observes the target, and the observer may feel a sense of incompatibility.

Therefore, according to the embodiment, the left eye image GL and the right eye image GR are rotated by "a" degree which is the same rotation angle as that of the pupil splitting polarizing separation element 12 using the rotation processing units 18L and 18R, as described above. That is, the left eye image GL and the right eye image GR are rotated according to a bearing in which the observer is located.

In this manner, it is possible to cause an orientation of a target which is projected on an image to match an orientation of the target when an observer actually observes the target from a bearing in which the observer is located, and it is possible to prevent an occurrence of a sense of incompatibility which is caused when the orientation of the target on the image and the orientation of the target when the target is actually observed do not match with each other.

1-4. Conclusion and Effect

As described above, the optical unit 2 in the embodiment includes the condensing lens 11 which condenses light from an object, the pupil splitting polarizing separation element 12 which separately outputs two linearly polarized light beams PL and PR of which polarizing directions are different from the condensed light using the left eye side polarizing separation region 12L and the right eye side polarizing separation region 12R which are formed by having the pupil splitting line 12a which is orthogonal to the optical axis Ox as a border, the polarizing direction conversion element 13 which converts the polarizing directions of the two linearly polarized light beams PL and PR which are output from the pupil splitting polarizing separation element 12, and the rotation driving unit 15 which rotates the pupil splitting polarizing separation element 12 and the polarizing direction conversion element 13 in a direction about the optical axis Ox.

In this manner, the polarizing directions of the two linearly polarized light beams PL and PR are adjusted by rotating the polarizing direction conversion element 13, even if the polarizing directions of the two linearly polarized light beams PL and PR which are output from the pupil splitting polarizing separation element 12 are changed when the pupil splitting polarizing separation element 12 (pupil splitting line 12a) is rotated according to a bearing in which an observer is located. In addition, even if the pupil splitting polarizing separation element 12 is rotated, it is possible to make the polarizing directions of the two linearly polarized light beams which are output from the polarizing direction conversion element 13 unchangeable, when the polarizing directions of the two linearly polarized light beams PL and PR which are changed due to the rotation of the pupil splitting polarizing separation element 12 are adjusted by rotating the polarizing direction conversion element 13.

When the polarizing direction of each linearly polarized light which is output from the polarizing direction conversion element 13 is unchangeable, the imaging element 3 is not necessarily rotated when individually receiving an image corresponding to the left eye image GL, and an image corresponding to the right eye image GR using polarizing. Accordingly, in the optical unit 2 according to the embodiment, it is possible to present a stereoscopic image with no sense of incompatibility without rotating the imaging element 3, even when a bearing in which an observer is located with respect to a target is changed.

In addition, in the optical unit 2 according to the embodiment, the polarizing direction conversion element 13 is configured of a half-wave plate, the direction of the crystal axis of the half-wave plate when the rotation angles of the pupil splitting polarizing separation element 12 and the polarizing direction conversion element 13 are the initial angle matches the middle direction of the polarizing directions of the two linearly polarized light beams PL and PR which are output from the pupil splitting polarizing separation element 12, and the rotation driving unit 15 rotates the polarizing direction conversion element 13 by the rotation angle (a/2) which is a half of the rotation angle (a) of the pupil splitting polarizing separation element 12.

In this manner, even when the pupil splitting polarizing separation element 12 is rotated according to the change in bearing in which an observer is located with respect to a target, there is no change in polarizing directions of the two linearly polarized light beams PL and PR which are output from the polarizing direction conversion element 13.

Accordingly, even when a bearing in which an observer is located with respect to a target is changed, it is possible to present a stereoscopic image with no sense of incompatibility without rotating the imaging element 3.

In addition, in the above descriptions, an example in which the angle difference between the polarizing directions of the two linearly polarized light beams PL and PR and the crystal axis of the half-wave plate is respectively 45 degrees and −45 degrees is described as an example in which the direction of the crystal axis of the polarizing direction conversion element 13 using the half-wave plate matches the middle direction of the polarizing directions of the two linearly polarized light beams PL and PR which are output from the pupil splitting polarizing separation element 12, however, the angle difference may be arbitrary when the polarizing directions of the two linearly polarized light beams PL and PR which are output from the polarizing direction conversion element 13 are unchangeable regardless of the rotation of the pupil splitting polarizing separation element 12.

As an example, in a case in which the angle difference between the polarizing directions of the linearly polarized light beams PL and PR when the rotation angles of the pupil splitting polarizing separation element 12 and the polarizing direction conversion element 13 are the initial angles and the crystal axis of the half-wave plate is respectively 60 degrees and −60 degrees, when the angles of the polarizing directions of the linearly polarized light beams PL and PR which are output from the polarizing direction conversion element 13 are obtained in each rotation angle of the pupil splitting polarizing separation element 12, the following are obtained.
when 0 degree: a=0 degree, a/2=0 degree
PL: 60 degrees−60 degrees×2=−60 degrees
PR: −60 degrees+60 degrees×2=60 degrees
when 45 degrees: a=45 degrees, a/2=22.5 degrees
PL: 105 degrees−82.5 degrees×2=−60 degrees
PR: −15 degrees+37.5 degrees×2=60 deg
when 90 degrees: a=90 degrees, a/2=45 degrees
PL: 150 degrees−105 degrees×2=−60 degrees
PR: 30 degrees+15 degrees×2=60 degrees
when 135 degrees: a=135 degrees, a/2=67.5 degrees
PL: 195 degrees−127.5 degrees×2=−60 degrees
PR: 75 degrees−7.5 degrees×2=60 degrees
when 270 degrees (−90 degrees): a=270 degrees, a/2=135 degrees
PL: 330 degrees−195 degrees×2=−60 degrees (315 degrees)
PR: 210 degrees−75 degrees×2=60 degrees
when 315 degrees (−45 degrees): a=315 degrees, a/2=157.5 degrees
PL: 15 degrees+142.5 degrees×2=−60 degrees (300 degrees)
PR: 255 degrees−97.5 degrees×2=60 degrees As is understood from the above described calculation result, when the polarizing directions of the two linearly polarized light beams PL and PR which are output from the polarizing direction conversion element 13 are unchangeable regardless of the rotation of the pupil splitting polarizing separation element 12, the direction of the crystal axis of the half-wave plate when the rotation angles of the pupil splitting polarizing separation element 12 and the polarizing direction conversion element 13 are the initial angle may match the middle direction of the polarizing directions of the two linearly polarized light beams PL and PR which are output from the pupil splitting polarizing separation element 12, and a specific angle difference between the polarizing directions of the linearly polarized light beams PL and PR and the crystal axis of the half-wave plate may be arbitrary.

In addition, in the optical unit 2 according to the embodiment, the left eye side polarizing separation region 12L and the right eye side polarizing separation region 12R in the pupil splitting line 12a are formed using a polarizer, and the transmission axis of the left eye side polarizing separation region 12L and the transmission axis of the right eye side polarizing separation region 12R are orthogonal to each other.

As described above, since the direction of the crystal axis of the half-wave plate when the rotation angles of the pupil splitting polarizing separation element 12 and the polarizing direction conversion element 13 are the initial angles matches the middle direction of the polarizing directions of the two linearly polarized light beams PL and PR which are output from the pupil splitting polarizing separation element 12, when the transmission axis of the left eye side polarizing separation region 12L and the transmission axis of the right eye side polarizing separation region 12R are orthogonal to each other, it means that the angle differences between polarizing directions of the linearly polarized light beams PL and PR and the crystal axis of the half-wave plate (angle differences when rotation angles of pupil splitting polarizing separation element 12 and polarizing direction conversion element 13 are initial angles) are 45 degrees and −45 degrees, respectively. In this manner, as is understood with reference to FIGS. 5A to 5G, the polarizing directions of the linearly polarized light beams PL and PR which are output from the polarizing direction conversion element 13 maintain the state of being orthogonal to each other, regardless of the rotation of the pupil splitting polarizing separation element 12.

Here, when individually receiving images corresponding to the left eye image GL and the right eye image GR using polarizing, for example, optical elements such as the polarizing plates 3a and 3b which have a selection function of selectively transmitting, absorbing, or reflecting only the linearly polarized light due to a predetermined polarizing direction is arranged in a rear stage of the polarizing direction conversion element 13, however, such an optical element exhibits the selection function to the maximum with respect to polarized light beams of which polarizing directions are orthogonal to each other in general. Accordingly, when the polarizing directions of the linearly polarized light beams PL and PR which are output from the polarizing direction conversion element 13 are orthogonal to each other, it is possible to prevent a polarized light beam on the other side from being leaked with respect to a polarized light beam on one side to be extracted in the above described optical element, and to prevent a cross talk between the left eye image GL and the right eye image GR.

In addition, the imaging apparatus 1 according to the embodiment includes the optical unit 2, and image obtaining unit (imaging element 3 and signal processing unit 4) which individually receives the two linearly polarized light beams PL and PR of which polarizing directions are converted by the polarizing direction conversion element 13, and obtains the left eye image GL and the right eye image GR.

Since the imaging apparatus 1 according to the embodiment includes the optical unit 2, it is possible to make the polarizing directions of the two linearly polarized light beams which are output from the polarizing direction conversion element 13 unchangeable even when the pupil splitting polarizing separation element 12 (pupil splitting line 12a) is rotated according to the change in a bearing in which an observer is located.

Accordingly, it is possible to present a stereoscopic image with no sense of incompatibility without rotating the imaging element 3, even when the bearing in which the observer is located is changed.

In addition, the imaging apparatus 1 according to the embodiment includes the rotation processing units 18L and 18R which rotate the left eye image GL and the right eye image GR.

In this manner, it is possible to make an orientation of a target which is projected on a stereoscopic image which is realized by the left eye image GL and the right eye image GR match an orientation of a target which is observed when the target is actually observed from a bearing in which an observer is located with respect to the target.

Accordingly, it is possible to prevent an occurrence of a sense of incompatibility which is caused by discordance between the orientation of the target on the stereoscopic image and the orientation of the target when the target is actually observed.

In addition, in the imaging apparatus 1 according to the embodiment, the image obtaining unit individually receives the two linearly polarized light beams PL and PR using the imaging element 3 in which the two polarizing plates 3a and 3b of which the directions of the transmission axes are different from each other are formed on the light receiving face, and obtains the left eye image GL and the right eye image GR. In this manner, it is possible to individually receive two linearly polarized light beams PL and PR using one imaging element 3. Accordingly, it is possible to reduce the number of components and reduce space, and to miniaturize the imaging apparatus 1.

2. Another Configuration Example of Optical Unit 2-1. Configuration Example 1

Figure 7:
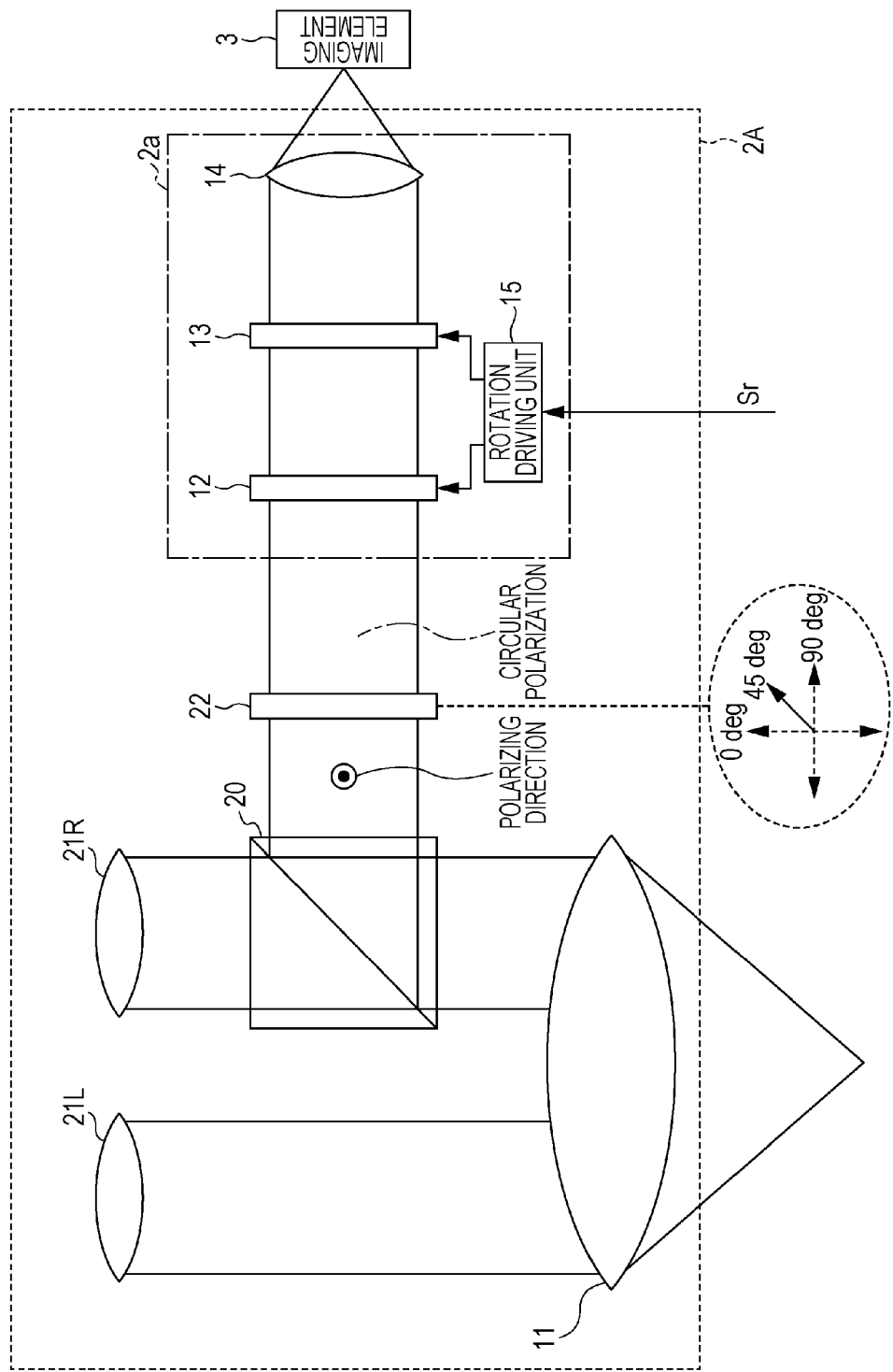
FIG. 7 is an explanatory diagram related to another configuration example (configuration example 1) of the optical unit.

FIG. 7 is an explanatory diagram of an optical unit 2A as a configuration example 1.

In addition, in the following descriptions, the same reference numerals are given to portions which are described in advance, and descriptions thereof will be omitted.

In the optical unit 2A, it is also possible to perform an observation through naked eyes using eyepieces 21L and 21R, not only an observation using a stereoscopic image.

In the optical unit 2A, light which passes through a left end portion of the condensing lens 11 from an object side is input to the eyepiece 21L. In addition, light which passes through a right end portion of the condensing lens 11 from the object side is input to a polarization beam splitter 20, a part thereof is reflected on a spectral face of the polarization beam splitter 20, and another part penetrates the spectral face. The light which has penetrated the spectral face is input to the eyepiece 21R.

In this manner, when the light which has passed through the left end portion of the condensing lens 11 is input to the eyepiece 21L, and the light which has passed through the right end portion of the condensing lens 11 is input to the eyepiece 21R, it is possible to execute stereopsis of a target by performing an observation through the eyepieces 21L and 21R.

The light which is reflected on the spectral face of the polarization beam splitter 20 is input to a quarter-wave plate 22.

Here, the light which is reflected on the spectral face of the polarization beam splitter 20, and is input to the quarter-wave plate 22 is set to a linearly polarized light. Specifically, the spectral face of the polarization beam splitter 20 in this case is configured so as to selectively reflect linearly polarized light which is parallel to an axis of which a polarizing direction is 90 degrees to 270 degrees, and accordingly, a polarizing direction of the linearly polarized light which is input to the quarter-wave plate 22 is set to be parallel to the axis of which the polarizing direction is 90 degrees to 270 degrees.

In the quarter-wave plate 22, as illustrated in FIG. 7, an installation angle of an optical axis Ox in the rotation direction is set such that a direction of a crystal axis faces a direction of 45 degrees. That is, the installation angle is set so as to provide an angle difference of 45 degrees between a polarizing direction of input linearly polarized light and the crystal axis. In this manner, light which is output through the quarter-wave plate 22 is converted into circularly polarized light.

The circularly polarized light which is output from the quarter-wave plate 22 is input to a pupil splitting rotation imaging optical system 2a. Here, the pupil splitting rotation imaging optical system 2a denotes a portion which is configured of the pupil splitting polarizing separation element 12, the polarizing direction conversion element 13, the image forming lens 14, and the rotation driving unit 15 in the optical unit 2 illustrated in FIG. 2.

The circularly polarized light which is input to the pupil splitting rotation imaging optical system 2a is separated into two linearly polarized light beams PL and PR of which polarizing directions are orthogonal to each other due to the left eye side polarizing separation region 12L and the right eye side polarizing separation region 12R of the pupil splitting polarizing separation element 12. Hereinafter, descriptions regarding a process in which the two linearly polarized light beams PL and PR are individually received by the imaging element 3 regardless of the rotation of the pupil splitting polarizing separation element 12 will be omitted, since the process is the same as that in the optical unit 2.

In addition, the same configuration as that in the imaging apparatus 1 will be adopted for a configuration in the rear stage of the imaging element 3.

2-2. Configuration Example 2

Figure 8:
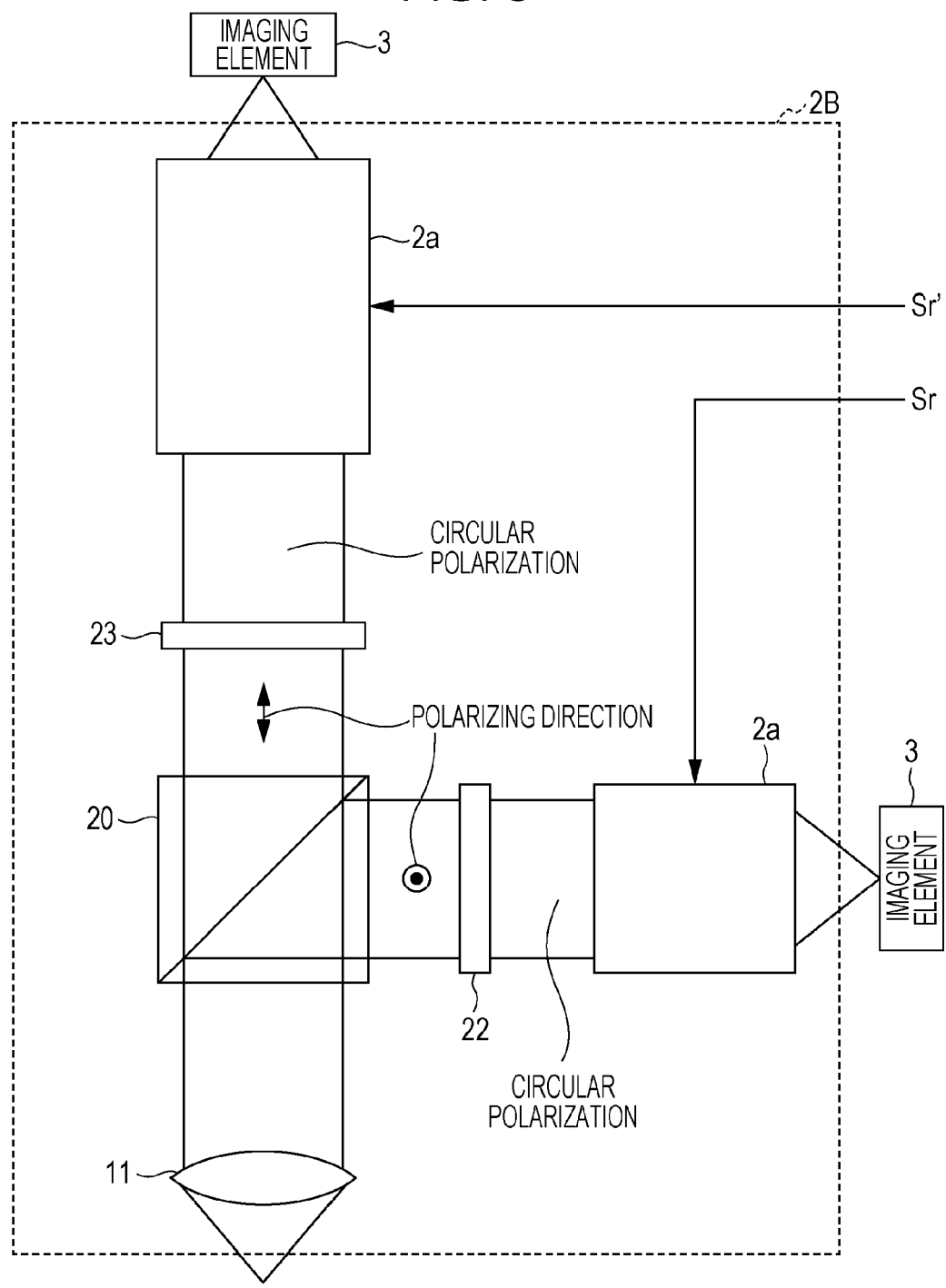
FIG. 8 is an explanatory diagram related to still another configuration example (configuration example 2) of the optical unit.

FIG. 8 is an explanatory diagram of an optical unit 2B as a configuration example 2.

The optical unit 2B is configured so as to provide a stereoscopic image to two observers.

In the optical unit 2B, two pupil splitting rotation imaging optical systems 2a are provided so as to provide stereoscopic images of two systems. In addition, in this case, two imaging elements 3 are provided in total in each of the pupil splitting rotation imaging optical systems 2a.

In addition, the polarization beam splitter 20 for dividing light input from an object side through the condensing lens 11 into two pupil splitting rotation imaging optical systems 2a is provided in the optical unit 2B.

The light input from the object through the condensing lens 11 is input to the polarization beam splitter 20, a part thereof is reflected on a spectral face of the polarization beam splitter 20, and another part penetrates the spectral face. The light reflected on the spectral face, and the light which penetrates the spectral face become linearly polarized light beams of which polarizing directions are orthogonal to each other.

The light which is reflected on the spectral face of the polarization beam splitter 20 is input to one pupil splitting rotation imaging optical system 2a through the quarter-wave plate 22 due to circularly polarized light.

On the other hand, the light which penetrates the spectral face of the polarization beam splitter 20 is input to the other pupil splitting rotation imaging optical system 2a through a quarter-wave plate 23. Similarly to the quarter-wave plate 22, the quarter-wave plate 23 is provided so that an angle difference of 45 degrees is provided between the polarizing direction of the input linearly polarized light and the crystal axis. For this reason, the light which penetrates the spectral face of the polarization beam splitter 20 is input to the other pupil splitting rotation imaging optical system 2a through the quarter-wave plate 23 using the circularly polarized light.

In this manner, when the circularly polarized light is input to the pupil splitting rotation imaging optical system 2a, two linearly polarized light beams PL and PR are individually received using the imaging element 3 regardless of rotating of the pupil splitting polarizing separation element 12.

Here, when there are two observers using a stereoscopic image, it is assumed that the observers are located in different bearings with respect to a target. Therefore, the imaging apparatus which corresponds to the configuration example 2 is configured so that two observers are able to individually designate bearings. Specifically, the control unit 9 in this case is configured so as to receive instruction inputs from two bearings. In addition, the control unit 9 in this case provides an instruction signal Sr corresponding to information on one bearing which is input in an instructing manner to the rotation driving unit 15 in one pupil splitting rotation imaging optical system 2a, and provides an instruction signal Sr corresponding to information on the other bearing which is input in an instructing manner to the rotation driving unit 15 in the other pupil splitting rotation imaging optical system 2a.

In this manner, in stereoscopic images which are provided to two observers, it is possible to prevent an occurrence of a sense of incompatibility which is caused when the orientation of the pupil splitting line 12a is not appropriate.

In addition, it is needless to say that at least the signal processing unit 4, the display control unit 5, and the display unit 6 are provided in each imaging element 3 in the imaging apparatus corresponding to the configuration example 2. At this time, when preventing an occurrence of a sense of incompatibility which is caused when orientation of a target on an image with respect to respective stereoscopic images which are obtained through each imaging elements 3 does not match orientation of the target when the target is actually observed, it is configured so that instruction signals are individually provided to the rotation processing units 18L and 18R in the signal processing unit 4 which are provided on one imaging element 3 side, and the rotation processing units 18L and 18R in the signal processing unit 4 which are provided on the other imaging element 3 side. Specifically, the control unit 9 in this case individually generates the instruction signal Ss corresponding to a bearing which is input in an instructing manner by one observer, and an instruction signal Ss' corresponding to a bearing which is input in an instructing manner by the other observer, and provides the instruction signal Ss to the rotation processing units 18L and 18R on the one imaging element 3 side, and provides the instruction signal Ss' to the rotation processing units 18L and 18R on the other imaging element 3 side.

3. Modification Example

In addition, the present technology is not limited to the above described specific examples, and various modification examples are taken into consideration.

Figure 9:
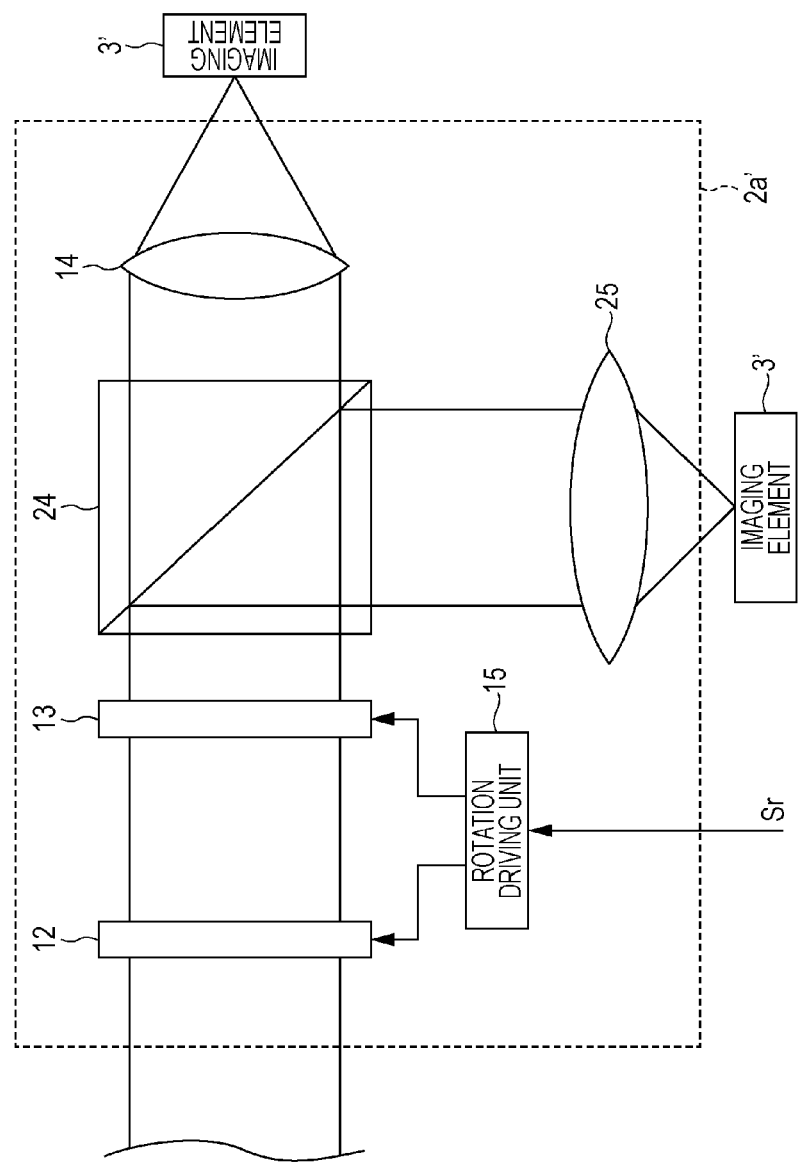
FIG. 9 is an explanatory diagram related to a configuration of an optical unit as a modification example.

For example, in the above descriptions, the example in which an image corresponding to the left eye image GL, and an image corresponding to the right eye image GR are individually received using one imaging element 3 in which the polarizing plates 3a and 3b are formed has been described, however, the configuration for receiving each image corresponding to the left eye image GL, and the right eye image GR are not limited to this, and for example, as illustrated in FIG. 9, it is also possible to adopt a configuration in which each image which is split using the polarization beam splitter 24 is individually received using two imaging elements 3'.

In this case, a pupil splitting rotation imaging optical system 2a' is provided instead of the pupil splitting rotation imaging optical system 2a. The pupil splitting rotation imaging optical system 2a' has a configuration in which a polarization beam splitter 24 is inserted between the polarizing direction conversion element 13 and the image forming lens 14 with respect to the pupil splitting rotation imaging optical system 2a, and an image forming lens 25 to which light which is reflected on the spectral face of the polarization beam splitter 24 is input is added.

As described above, since the linearly polarized light beams Pt and PR which are output from the polarizing direction conversion element 13 are orthogonal to each other, one of these penetrates a spectral face of the polarization beam splitter 24, and the other is reflected on the spectral face of the polarization beam splitter 24. The linearly polarized light which penetrates the spectral face of the polarization beam splitter 24 is formed on a light receiving face of one imaging element 3' through the image forming lens 14, and the light which is reflected on the spectral face of the polarization beam splitter 24 is formed on the other imaging element 3' through the image forming lens 25. In the imaging element 3', the polarizing plates 3a and 3b in the imaging element 3 are omitted.

According to the configuration illustrated in FIG. 9, since it is possible to split the linearly polarized light beams Pt and PR which are output from the polarizing direction conversion element 13 using the polarization beam splitter 24, it is possible to individually receive the split linearly polarized light beams PL and PR using the respective imaging elements 3'.

Since it is possible to omit the polarizing plates 3a and 3b included in the imaging element 3', it is possible to make the configuration simple.

In addition, in the respective imaging elements 3', it is possible to receive one of the linearly polarized light beams Pt and PR corresponding thereto, it is not necessary to perform a process of dividing the imaged image signals on the left and right sides with respect to the imaged image signal using the individual imaging element 3'. In addition, when the dividing process is not necessary, there is no omitted portion in the imaged image signal of the individual imaging element 3', and thus, it is not necessary to perform interpolation processing as the developing processing, which was described above, in the signal processing unit 4 of this case, and it is possible to reduce a processing load.

In addition, in the above descriptions, a case in which the present technology is applied to an operation microscope has been exemplified, however, it is possible to preferably apply the present technology to other optical goods such as an endoscope, for example.

In addition, effects which are described in the specification are merely examples, are not limited, and may include another effect.

4. Present Technology

The present technology can also adopt the following configuration.

(1) An optical unit which includes a condensing lens which condenses light from an object; a pupil splitting polarization separation element which separately outputs two linearly polarized light beams of which polarizing directions are different from the condensed light using a left eye polarization separation region and a right eye polarization separation region which are formed by having a pupil splitting line which is orthogonal to an optical axis as a border; a polarizing direction conversion element which converts polarizing directions of the two linearly polarized light beams which are output from the pupil splitting polarization separation element; and a rotation driving unit which rotates the pupil splitting polarization separation element and the polarizing direction conversion element in an optical axis rotational direction.

(2) The optical unit described in (1), in which the polarizing direction conversion element is configured of a half-wave plate, a direction of a crystal axis of the half-wave plate when rotation angles of the pupil splitting polarization separation element and the polarizing direction conversion element are initial angles matches an intermediate direction of the two linearly polarized light beams which are output from the pupil splitting polarization separation element, and the rotation driving unit rotates the polarizing direction conversion element by a rotation angle of a half of a rotation angle of the pupil splitting polarization separation element.

(3) The optical unit described in (2), in which the left eye polarization separation region and the right eye polarization separation region in the pupil splitting polarization separation element are formed using a polarizer, and a transmission axis in the left eye polarization separation region is orthogonal to a transmission axis in the right eye polarization separation region.

(4) An imaging apparatus which includes an optical unit including a condensing lens which condenses light from an object, a pupil splitting polarization separation element which separately outputs two linearly polarized light beams of which polarizing directions are different from the condensed light using a left eye polarization separation region and a right eye polarization separation region which are formed by having a pupil splitting line which is orthogonal to an optical axis as a border, a polarizing direction conversion element which converts the polarizing directions of the two linearly polarized light beams which are output from the pupil splitting polarization separation element, and a rotation driving unit which rotates the pupil splitting polarization separation element and the polarizing direction conversion element in an optical axis rotational direction; and an image obtaining unit configured to obtain a left eye image and a right eye image by individually receiving the two linearly polarized light beams of which polarizing directions are converted by the polarizing direction conversion element.

(5) The imaging apparatus described in (4), which includes an image rotation processing unit which rotates the left eye image and the right eye image.

(6) The imaging apparatus described in (4) or (5), in which the image obtaining unit obtains the left eye image and the right eye image by individually receiving the two linearly polarized light beams using an imaging element in which two polarizing plates of which directions of transmission axes are different from each other are formed on a light receiving face.

(7) The imaging apparatus described in (4) or (5), in which the image obtaining unit includes a polarization beam splitter which spectrally disperses the two linearly polarized light beams, and two imaging elements which receive one of the two linearly polarized light beams which is spectrally dispersed by the polarization beam splitter, respectively.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit for providing two orthogonally polarized light beams, comprising:
    a condensing lens which condenses light from an object;
    a pupil splitting polarization separation element having a left eye polarization separation region and a right eye polarization separation region that are divided by a pupil splitting line which is orthogonal to an optical axis, wherein the left eye polarization separation region and the right eye polarization separation region output two respective linearly polarized light beams with orthogonal polarization directions;
    a polarizing direction conversion element comprising a half-wave plate for converting the polarization directions of the two linearly polarized light beams output from the pupil splitting polarization separation element; and
    a rotation driving unit which rotates the pupil splitting polarization separation element and the polarizing direction conversion element in an optical axis rotational direction with the rotation angle of the polarizing direction conversion element being half of the rotation angle of the pupil splitting polarization separation element to generate the two orthogonally polarized light beams to have different axis angles, wherein the rotation angle of the polarizing direction conversion element is the same as the angle of the crystal axis of the polarizing direction conversion element.

2. The optical unit according to claim 1, wherein the left eye polarization separation region and the right eye polarization separation region in the pupil splitting polarization separation element are formed using a polarizer, and a transmission axis in the left eye polarization separation region is orthogonal to a transmission axis in the right eye polarization separation region.

3. An imaging apparatus comprising:
    an optical unit for providing two orthogonally polarized light beams which includes
    a condensing lens which condenses light from an object,
    a pupil splitting polarization separation element having a left eye polarization separation region and a right eye polarization separation region that are divided by a pupil splitting line which is orthogonal to an optical axis, wherein the left eye polarization separation region and the right eye polarization separation region output two respective linearly polarized light beams with orthogonal polarization directions,
    a polarizing direction conversion element comprising a half-wave plate for converting the polarization directions of the two linearly polarized light beams output from the pupil splitting polarization separation element, and
    a rotation driving unit which rotates the pupil splitting polarization separation element and the polarizing direction conversion element in an optical axis rotational direction with the rotation angle of the polarizing direction conversion element being half of the rotation angle of the pupil splitting polarization separation element to generate the two orthogonally polarized light beams to have different axis angles, wherein the rotation angle of the polarizing direction conversion element is the same as the angle of the crystal axis of the polarizing direction conversion element; and
    an image obtaining unit configured to obtain a left eye image and a right eye image by individually receiving the two linearly polarized light beams of which polarizing directions are converted by the polarizing direction conversion element.

4. The imaging apparatus according to claim 3, further comprising:
    an image rotation processing unit which rotates the left eye image and the right eye image.

5. The imaging apparatus according to claim 3, wherein the image obtaining unit obtains the left eye image and the right eye image by individually receiving the two linearly polarized light beams using an imaging element in which two polarizing plates of which directions of transmission axes are different from each other are formed on a light receiving face.

6. The imaging apparatus according to claim 3, wherein the image obtaining unit includes a polarization beam splitter which disperses the two linearly polarized light beams, and two imaging elements which receive one of the two linearly polarized light beams which are dispersed by the polarization beam splitter, respectively.

7. The imaging apparatus of claim 3, wherein the rotation driving unit is configured to rotate the polarizing direction conversion element and the pupil splitting polarization elements such that the polarizing directions of the two linearly polarized light beams incident on the imaging element remain the same when the pupil splitting polarization element rotates, without rotating the imaging element in the optical axis rotation direction.

* * * * *